No. 614,930. Patented Nov. 29, 1898.
G. D. BURTON.
PROCESS OF AND APPARATUS FOR SEPARATING METALS FROM ORES BY ELECTRICITY.
(Application filed Apr. 11, 1898.)
(No Model.)
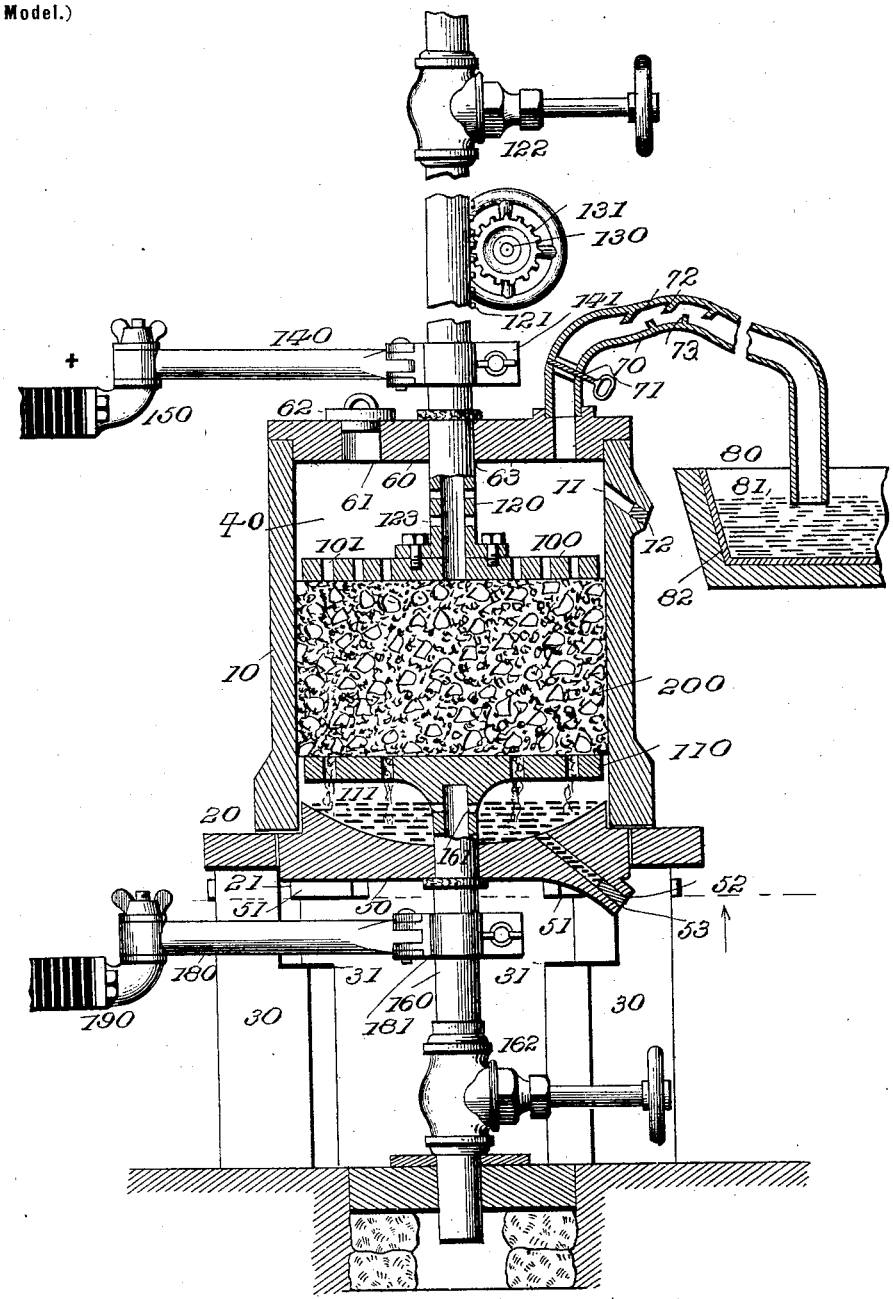

UNITED STATES PATENT OFFICE.

GEORGE D. BURTON, OF BOSTON, MASSACHUSETTS.

PROCESS OF AND APPARATUS FOR SEPARATING METALS FROM ORES BY ELECTRICITY.

SPECIFICATION forming part of Letters Patent No. 614,930, dated November 29, 1898.

Original application filed January 25, 1897, Serial No. 620,591. Divided and this application filed April 11, 1898. Serial No. 677,176. (No model.)

*To all whom it may concern:*

Be it known that I, GEORGE D. BURTON, a citizen of the United States of America, residing at Boston, in the county of Suffolk, in the State of Massachusetts, have invented certain new and useful Improvements in Processes of and Apparatus for Separating Metals from Ores by Electricity, of which the following is a specification.

This invention relates to the reduction of refractory ores containing gold, silver, or other metal united with sulfur, arsenic, or other rebellious substance in a rapid, thorough, and economical manner.

The invention consists principally in the process of separating metals from ore by subjecting the mass of ore to pressure and simultaneously to an electric heating-current, the pressure being maintained during the reduction of the ore and causing the particles thereof to maintain contact as the mass of ore diminishes.

As regards the apparatus the invention relates more especially to an electrical furnace which is connected with an electrical apparatus for producing a current of large volume, preferably similar to that described in patents of the United States, No. 475,232, to George D. Burton, Arthur H. Eddy, and George T. Briggs, dated May 17, 1892; No. 475,184, to George D. Burton, dated May 17, 1892, and No. 486,625, to George D. Burton, dated November 22, 1892. I have used an apparatus of this character producing an alternating current of from sixteen hundred to eighteen hundred volts and twenty-four amperes transformed into a current of from four to sixteen volts and from six thousand to seven thousand amperes.

The invention further consists in certain combinations of parts hereinafter claimed.

This application is a division of my application, Serial No. 620,591, filed January 25, 1897.

The accompanying drawing represents a vertical section of this apparatus.

The furnace comprises a body 10, composed of non-conducting material and preferably constructed in cylindrical form. This body rests on a base-ring 20, supported on piers 30, and forms the reduction-chamber 40. It is provided at the upper part of the reduction-chamber with an escape-hole 11 for gases, normally closed by a plug 12 or otherwise. A removable bottom 50 serves to close the lower end of the reduction-chamber. This bottom is supported on bolts 51, which slide in guideways 21 in the piers 30. By retracting the bolts the bottom can be lowered into contact with the shoulders 31 on the piers 30 and the contents of the furnace removed. The bottom is provided with a tap-hole or spout 52 for drawing off the molten metal, said spout being closed by any suitable plug 53. The top of the reduction-chamber is closed by a cover 60, having a hand-hole or manhole 61, closed by a plate 62. The top or cover 60 is provided with an outlet-opening 63.

A collecting-tank 80 for the sulfur, arsenic, and other by-products is disposed adjacent to the furnace and contains water or a watery liquid. This tank may be constructed of wood or other suitable material and be provided with a lining 82, composed of zinc, lead, or copper.

A pipe 70, provided with a damper 71, connects the opening 63 of the reduction-chamber with the tank, the discharge end of the pipe being below the surface of the watery liquid 81 therein. This pipe is provided with damper-plates 72 and 73, disposed in alternation on opposite sides of the pipe for the purpose of checking the free flow of the gases and floating matter and causing the latter to be deposited within the pipe.

Two electrodes 100 and 110 are disposed one over the other in the reduction-chamber and are connected with opposite electric poles of a source of heating electric current. These electrodes are preferably in the form of plates and are preferably provided with holes or perforations 101 and 111, respectively, so that the gaseous fumes may pass through the upper one and the molten metal through the lower one. They are composed of suitable material of high electric conductivity.

The upper electrode 100 is attached to and supported by a hollow rod 120, of copper or other suitable conductive material. This rod is provided with a rack 121. A shaft 130 is provided with a pinion 131, which meshes with said rack, and with a hand-wheel 132 or other operative means, whereby said rod, and consequently the electrode 100, may be raised or lowered. This hollow rod is provided with a valve 122 and with holes 123 within the reduction-chamber and serves to supply air, gas, or steam when desired to the reduction-chamber 40. An electroconductive arm 140, of copper or other suitable material, is connected at its inner end with a terminal 150 of a converter or other source of heating-current and is provided at its outer end with a clamp 141, which engages the rod 120.

The lower electrode 110 is attached to a vertical conductive rod 160, preferably hollow and provided with openings 161 within the reduction-chamber. This rod extends into a channel 170 and is provided with a valve 162, and by this means air, gas, or steam may be supplied to the reduction-chamber. This lower electrode is disposed above the bottom of the reducing-chamber and forms a separate space underneath it for the molten metal, which may flow around the edge thereof or through the holes therein.

Both of the electrodes are preferably constructed so as to occupy substantially the entire cross-sectional area of the chamber and operate to clamp the mass of ore contained therein.

An arm 180, of conductive material, is connected at one end to the other terminal or pole 190 of the converter and provided at its outer end with a clamp 181, which grasps the rod 160.

The electrodes 100 and 110 may be composed of an alloy of copper three parts, antimony two parts, and tin one part. These electrodes being of higher conductivity than the ore are not overheated by the current, and being perforated for the passage of air they are not overheated by the contents of the furnace.

In carrying out the process by the use of the apparatus as described the rebellious or other ore is placed in the reducing-chamber 40 between the electrodes 100 and 110, both electrodes being in contact with the mass of ore. With sulfids and other rebellious ores a little charcoal or other combustible material is added to the ore, and sometimes a little common salt or chlorate of potash or borax or other flux or reducing agent is mixed with the ore. The furnace is closed, including the valves 122, 162, and 71. The electric current is then turned on, and when the poles are arranged as shown the current passes from the electrode 100 to the electrode 110 through the mass of ore 200. The ore allows the current to pass, but offers sufficient resistance to develop the necessary heat in the mass. As soon as the ore becomes sufficiently heated to eliminate the moisture contained therein the valve 122 is opened and the moist vapors escape through the hollow rod 120. When the moist vapors have passed off, the valve 122 is closed and the valve 71 is opened. The volume of the current is then increased and the ore subjected to a roasting heat, the sulfur and other by-products passing off in the shape of fumes. These fumes are conducted through the pipe 70 into the tank 80 of watery liquid, and the sulfur may be converted into sulfuric acid. When the fumes containing the by-products have been forced off from the ore under treatment, the valve 71 is closed and the valve 162 is opened and air or oxygen is admitted to the furnace for a few seconds or minutes, and this air or oxygen unites with any sulfur or combustible matter that may remain in the ore and creates combustion. The valve 122 is then also opened for a few seconds or minutes. When the roasting operation is completed, both valves 122 and 162 are closed and the volume of current increased, so that the heat in the mass of ore is raised to a reducing temperature for the metal having the lowest fusing-point. Such metal on becoming fused drops through the holes 111 in the lower electrode 110 into the lower part of the furnace, and may then be drawn off through the spout 52. If necessary at this stage, additional flux may be added to the mass of ore and the heat still further increased by increasing the volume of the electric current. If the ore contains two or more metals, when one of the metals has been eliminated the volume of the electric current is increased and a heat produced sufficient to melt the metal of the next higher fusing-point, and this metal is melted and taken out in the same manner. The operation is repeated until all the metals contained in the ore are extracted and separately drawn off.

On reducing galena ore the reducing agent may be omitted, if desired.

The melting out of the metal from the ore causes the mass of ore to diminish in bulk, and one of the electrodes is made to move and maintain contact with the diminishing mass, so as to keep the circuit closed. In the form illustrated the upper electrode is moved in downward direction.

When it becomes necessary to rotate the pipe 160 to stir up the ore in the furnace, the screws of the clamps 141 and 181 are loosened, and the pipe is turned by the wheel 131.

I claim as my invention—

1. The process of treating ore which consists in subjecting the whole mass of ore under treatment to pressure, and simultaneously to an electric current of high amperage and low voltage, and causing the pressure to follow the diminishing mass of ore during the operation.

2. In an electrical furnace, the combination of a reducing-chamber, and two perforated electrodes disposed in said chamber and adapted to clamp between them the mass of ore or other substance to be heated, said electrodes being connected with opposite poles of a source of electric heating-current, one of said electrodes being movable and adapted to maintain electric contact with the diminishing mass of the substance being heated and reduced.

3. In an electric furnace, the combination of a reducing-chamber, electrodes in the form of perforated plates disposed within said chamber and supported on tubular perforated rods, one of said electrodes being movable, and means for supplying air, gas or steam through said tubular ports.

4. In an electrical furnace, the combination of a reducing-chamber, two electrodes disposed in said chamber and adapted to clamp a mass of ore between them, the upper electrode being movable and adapted to maintain contact with the diminishing mass of the substance being heated, the lower electrode being elevated above the bottom of the furnace, forming a receptacle beneath for the melted metal, and both electrodes being connected to the opposite poles of a source of current.

5. In an electric furnace, the combination of a reducing-chamber, and two electrodes disposed in said chamber and adapted to clamp between them the mass of ore or other substance to be heated, said electrodes being connected with opposite poles of a source of electric heating-current, one of said electrodes being movable and adapted to maintain electric contact with the diminishing mass of the substance being heated and reduced, the lower electrode being disposed above the bottom of said chamber and leaving beneath a receptacle for the molten metal.

6. In an electrical furnace, the combination of a reducing-chamber, and two electrodes disposed in said chamber and adapted to clamp between them the mass of ore or other substance to be heated, said electrodes being connected with opposite poles of a source of electric current, the lower electrode being disposed above the bottom of said chamber and having beneath a receptacle for the molten metal, one of said electrodes being movable, and means for moving the movable electrode to maintain electric contact with the diminishing mass of said substance.

7. In an electrical furnace, the combination of a reducing-chamber, and two electrodes disposed in said chamber and each occupying substantially the entire cross-sectional area thereof and adapted to clamp between them the mass of ore or other substance to be heated, said electrodes being connected with opposite poles of a source of electric heating-current, one of said electrodes being movable and adapted to maintain electric contact with the diminishing mass of the substance being heated and reduced.

GEO. D. BURTON.

Witnesses:
LESTER H. WILLIAMS,
E. F. PHILIPSON.